US008713026B2

(12) United States Patent
Spence et al.

(10) Patent No.: US 8,713,026 B2
(45) Date of Patent: *Apr. 29, 2014

(54) METHOD FOR PLAYING DIGITAL MEDIA FILES WITH A DIGITAL MEDIA PLAYER USING A PLURALITY OF PLAYLISTS

(75) Inventors: Richard C. Spence, Santa Clara, CA (US); Kevin M. Conley, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/157,844

(22) Filed: Jun. 13, 2008

(65) Prior Publication Data

US 2009/0313303 A1    Dec. 17, 2009

(51) Int. Cl.
G06F 17/30 (2006.01)
(52) U.S. Cl.
USPC .......................................... 707/748; 707/803
(58) Field of Classification Search
USPC .............................. 707/802, 803, 748; 705/51
See application file for complete search history.

(56) References Cited

U.S. PATENT DOCUMENTS

| 5,481,509 | A * | 1/1996 | Knowles ........................ 386/224 |
| 5,986,200 | A | 11/1999 | Curtin |
| 6,243,725 | B1 | 6/2001 | Hempleman et al. |
| 6,590,303 | B1 | 7/2003 | Austin et al. |
| 6,727,421 | B2 * | 4/2004 | Izawa et al. ..................... 84/609 |
| 6,760,721 | B1 | 7/2004 | Chasen et al. |
| 6,763,345 | B1 | 7/2004 | Hempleman et al. |
| 6,842,405 | B1 | 1/2005 | D'Agosto |
| 7,003,515 | B1 | 2/2006 | Glaser et al. |
| 7,020,048 | B2 | 3/2006 | McComas |
| 7,028,082 | B1 | 4/2006 | Rosenberg et al. |
| 7,076,561 | B1 | 7/2006 | Rosenberg et al. |
| 7,133,924 | B1 | 11/2006 | Rosenberg et al. |
| 7,228,054 | B2 | 6/2007 | Cowgill |
| 7,560,637 | B1 | 7/2009 | Robbin et al. |
| 7,574,672 | B2 | 8/2009 | Jobs et al. |

(Continued)

FOREIGN PATENT DOCUMENTS

| CN | 101120413 | 2/2008 |
| EP | 1 414 042 | 4/2004 |

(Continued)

OTHER PUBLICATIONS

Baccigalupo, Claudio, et al., "A Case-Based Song Scheduler for Group Customised Radio", ICCBR 2007, LNAI 4626, Springer-Verlag, Berlin, Germany, © 2007, pp. 433-448.*

(Continued)

*Primary Examiner* — Shahid Alam
(74) *Attorney, Agent, or Firm* — Brinks Gilson & Lione (57) ABSTRACT

A method for playing digital media files with a digital media player using a plurality of playlists is disclosed. One embodiment uses a plurality of playlists—instead of a single playlist—to reference a given pool of digital media files. After the songs of one playlist have been played, another playlist is selected, and songs from that playlist are played. Since the playlist selection is automatically made by the digital media player while it is offline, a fresh listening experience is created without requiring the user to connect the digital media player to the Internet. Preferably, each playlist is purposefully curated to ensure that the play order keeps the experience commensurate with a particular brand message.

40 Claims, 6 Drawing Sheets

(56) References Cited

U.S. PATENT DOCUMENTS

| | | | |
|---|---|---|---|
| 7,956,272 B2 | 6/2011 | Wysocki et al. | |
| 8,126,923 B1* | 2/2012 | Hempleman et al. | 707/791 |
| 8,316,322 B2 | 11/2012 | Kim | |
| 2001/0013983 A1* | 8/2001 | Izawa et al. | 360/2 |
| 2002/0026521 A1 | 2/2002 | Sharfman et al. | |
| 2002/0046181 A1 | 4/2002 | Story, Jr. et al. | |
| 2002/0093884 A1* | 7/2002 | Hochendoner | 369/30.05 |
| 2002/0137529 A1 | 9/2002 | Takahashi | |
| 2002/0186842 A1* | 12/2002 | Sabet-Sharghi et al. | 380/200 |
| 2002/0194260 A1 | 12/2002 | Headley et al. | |
| 2003/0014496 A1 | 1/2003 | Spencer et al. | |
| 2003/0120644 A1 | 6/2003 | Shirota | |
| 2003/0135513 A1 | 7/2003 | Quinn et al. | |
| 2004/0039860 A1 | 2/2004 | Mills et al. | |
| 2004/0198279 A1 | 10/2004 | Anttila et al. | |
| 2004/0215733 A1 | 10/2004 | Gondhalekar et al. | |
| 2004/0254659 A1* | 12/2004 | Bolas et al. | 700/94 |
| 2004/0261040 A1* | 12/2004 | Radcliffe et al. | 715/840 |
| 2005/0038796 A1 | 2/2005 | Carlson et al. | |
| 2005/0108754 A1 | 5/2005 | Carhart et al. | |
| 2005/0195696 A1* | 9/2005 | Rekimoto | 369/30.08 |
| 2005/0216855 A1* | 9/2005 | Kopra et al. | 715/767 |
| 2006/0008256 A1 | 1/2006 | Khedouri et al. | |
| 2006/0010394 A1 | 1/2006 | Chaudhri et al. | |
| 2006/0031222 A1 | 2/2006 | Hannsmann | |
| 2006/0195480 A1* | 8/2006 | Spiegelman et al. | 707/104.1 |
| 2006/0195864 A1 | 8/2006 | New et al. | |
| 2006/0242068 A1 | 10/2006 | Jogand-Coulomb et al. | |
| 2006/0253782 A1* | 11/2006 | Stark et al. | 715/727 |
| 2006/0265403 A1* | 11/2006 | Mercer et al. | 707/10 |
| 2007/0038941 A1 | 2/2007 | Wysocki et al. | |
| 2007/0043667 A1 | 2/2007 | Qawami et al. | |
| 2007/0073937 A1 | 3/2007 | Feinberg et al. | |
| 2007/0083556 A1 | 4/2007 | Plastina et al. | |
| 2007/0112785 A1 | 5/2007 | Murphy et al. | |
| 2007/0168613 A1 | 7/2007 | Kim et al. | |
| 2007/0256021 A1 | 11/2007 | Prager et al. | |
| 2007/0265097 A1 | 11/2007 | Havukainen | |
| 2007/0282902 A1* | 12/2007 | Bustelo et al. | 707/104.1 |
| 2007/0282903 A1 | 12/2007 | Bustelo et al. | |
| 2007/0291404 A1 | 12/2007 | Morse et al. | |
| 2007/0294297 A1 | 12/2007 | Kesteloot et al. | |
| 2008/0010372 A1 | 1/2008 | Khedouri et al. | |
| 2008/0010450 A1 | 1/2008 | Holtzman et al. | |
| 2008/0022207 A1 | 1/2008 | Hsu et al. | |
| 2008/0086379 A1 | 4/2008 | Dion et al. | |
| 2008/0092198 A1 | 4/2008 | Hutten | |
| 2008/0092200 A1* | 4/2008 | Grady et al. | 725/133 |
| 2008/0094400 A1 | 4/2008 | Yang et al. | |
| 2008/0098447 A1 | 4/2008 | Yannai | |
| 2008/0147711 A1* | 6/2008 | Spiegelman et al. | 707/102 |
| 2008/0184127 A1 | 7/2008 | Rafey et al. | |
| 2008/0184142 A1* | 7/2008 | Ijichi et al. | 715/764 |
| 2008/0209322 A1 | 8/2008 | Kaufman | |
| 2008/0222314 A1* | 9/2008 | Matsushita et al. | 710/13 |
| 2008/0281867 A1 | 11/2008 | Kendall et al. | |
| 2009/0056525 A1* | 3/2009 | Oppenheimber | 84/609 |
| 2009/0088876 A1 | 4/2009 | Conley et al. | |
| 2009/0094160 A1 | 4/2009 | Webster et al. | |
| 2009/0106674 A1 | 4/2009 | Bray et al. | |
| 2009/0138907 A1 | 5/2009 | Wiser et al. | |
| 2009/0164473 A1 | 6/2009 | Bauer | |
| 2009/0171715 A1* | 7/2009 | Conley et al. | 705/7 |
| 2009/0204929 A1 | 8/2009 | Baurmann et al. | |
| 2009/0241070 A1 | 9/2009 | Robbin et al. | |
| 2009/0287649 A1 | 11/2009 | Park | |
| 2009/0313303 A1 | 12/2009 | Spence et al. | |
| 2009/0313432 A1 | 12/2009 | Spence et al. | |
| 2010/0153572 A1 | 6/2010 | Feig et al. | |
| 2010/0162120 A1 | 6/2010 | Niizawa et al. | |

FOREIGN PATENT DOCUMENTS

| | | |
|---|---|---|
| GB | 2 413 686 A | 11/2005 |
| WO | WO 2004/111882 | 12/2004 |
| WO | WO 2008/007269 | 1/2008 |

OTHER PUBLICATIONS

Baccigalupo, Claudio, et al., "Poolcasting: A Social web Radio Architecture for Group Customisation", AXMEDIS '07, Barcelona, Spain, Nov. 28-30, 2007, pp. 115-122.*

Baccigalupo, Claudio, et al., "Mining Musical Social Networks for Automating Social Music Services", Workshop Notes of the ECML/PKDD 2007 Workshop on Web Mining 2.0, © 2007, pp. 1-12.*

Pioneer XMP3 Press Release, Oct. 16, 2008 and XMP3 User Guide, 2008.

Office Action for U.S. Appl. No. 12/338,768, dated Mar. 15, 2011, 10 pages.

"Housing and Clip Assembly for Portable Electronic Device", U.S. Appl. No. 12/134,664, filed Jun. 6, 2008, Inventor: Hyekung Kim.

"User Evaluation of a New Interactive Playlist Generation Concept", Pauws et al., Queen Mary, University of London, pp. 638-643 (225).

Office Action for U.S. Appl. No. 12/338,768, dated Oct. 6, 2011, 13 pages.

Office Action for U.S. Appl. No. 11/967,861, dated Oct. 11, 2011, 10 pages.

Office Action for U.S. Appl. No. 11/967,861, dated Dec. 7, 2010, 11 pages.

Office Action for U.S. Appl. No. 12/157,846, dated Nov. 3, 2010, 11 pages.

Office Action for U.S. Appl. No. 12/157,846, dated Apr. 11, 2012, 10 pages.

Office Action for U.S. Appl. No. 12/338,768, dated Apr. 26, 2012, 12 pages.

Office Action directed against U.S. Appl. No. 12/157,846, 11 pages, Nov. 3, 2010.

Office Action directed against U.S. Appl. No. 12/157,846, 17 pages, May 4, 2011.

"Y! MUSIC™ jukebox", http://help.yahoo.com/l/us/yahoo/music/jukebox/features/index.html, 1 page, printed on Apr. 8, 2008.

"Get a Gremlin today!", http://www.musicgremlin.com/Device/DeviceList.aspx, 1 page, printed on Apr. 8, 2008.

"Solution frequently asked questions", 1 page, http://www.musicgremlin.com/StaticContent.aspx?id=8, 1 page, printed on Apr. 8, 2008.

"Portable Digital Content Device and Methods for Use Therewith," U.S. Appl. No. 11/973,871, filed Oct. 9, 2006, inventors: Kurt Webster, Phil Balma, Mairi MacDonald, Ron Barzilai, Avi Shmuel, Ran Carmeli, David Koren, and Moshe Raines.

"SanDisk Unveils USBTV—First Digital 'Flash DVD Player' for Porting Personal Video and Movies from Home PC to Home TV", http://www.sandisk.com/Corporate/PressRoom/PressReleases/PressRelease.aspx?ID=3678, Jan. 8, 2007, 2 pages.

"What is the Fanfare™ Web Service?", http://fanfare.sandisk.com/help/fanfare-internet-service.html, 1 page, printed on Apr. 8, 2008.

"What is the Fanfare™ Application?", http://fanfare.sandisk.com/help/fanfare-application.html, 1 page, printed on Apr. 8, 2008.

"What is Sansa® TakeTV™?", http://fanfare.sandisk.com/help/sansa-taketv.html, 1 page, printed on Apr. 8, 2008.

"How do Fanfare™ and Sansa® TakeTV™ work together?", http://fanfare.sandisk.com/help/how-does-it-work.html, 1 page, printed on Apr. 8, 2008.

"iTunes 7: The entertainment center of your world.", http://www.apple.com/itunes/overview/, 1 page, printed on Apr. 8, 2008.

"iPod shuffle—Features", http://www.apple.com/ipodshuffle/features.html, 1 page, printed on Apr. 8, 2008.

"SanDisk Anouces the Sansa Connect Wireless Internet MP3 Player", http://www.sandisk.com/Corporate/PressRoom/PressReleases/PressRelease.aspx?ID=3669, 2 pages, Jan. 8, 2007.

"Unlimited Music on Demand—Your Music—Anytime, Anywhere", http://www.napster.com/choose/index_default.html, 1 page, printed on Apr. 8, 2008.

(56) References Cited

OTHER PUBLICATIONS

"Rhapsody Channels", http://www.rhapsody.com/channels, 3 pages, printed on Apr. 8, 2008.

"PlaysForSure is growing up!", http://www.microsoft.com/windows/windowsmedia/playsforsure/, 1 page, printed on Apr. 8, 2008.

"XM Channel Lineup", http://www.xmradio.com/onxm/full-channel-listing.xmc, pp. 1-6, printed on Apr. 8, 2008.

"XPRESSEZ®—$39.99*"", 1 page, printed on Apr. 8, 2008.

Excerpts from Manual for Creative's Zen Stone: "License and Copyright," "A Tour of Your Player," "Mode Switch", "Playback Order", and "Folder Structure," 5 pages, May 2007.

"Vision listen without limits", http://musicgremlin.com/StaticContent.aspx?id=3, 1 page, printed on Apr. 8, 2008.

"Software PlayersPortable Radio Players Premium Radio RadioStoreSupport", http://www.slacker.com/products/portables/, 1 page, printed on Nov. 30, 2007.

AudioFeast's portable Net radio—MP3 users not limited to music, http://www.sfgate.com/cgi-bin/article.cgi?file=/c/a/2004/09/13/BUGV18N97H1.DTL&type . . . , 2 pages, Sep. 13, 2004.

"Powerfully Simple Digital Media Player and Methods for Use Therewith," U.S. Appl. No. 11/967,861, filed Dec. 31, 2007, inventors: Kevin M. Conley, Daniel Schreiber, Avi Shmuel, and Noam Kedem.

"Pseudorandom Number Generator," http://en.wikipedia.orq/wiki/Pseudorandom_number_generator, 5 page, printed May 20, 2008.

"New Rolling Stones Album, A Bigger Bang, Will Be Sold on New Gruvi Music Cards from SanDisk; Using SanDisk's TrustedFlash Technology, Latest Rolling Stones Album Can Be Played on Smartphones, Palm Devices and Notebook PCs," Sep. 27, 2005, 2 pages.

Office Action for Chinese Patent Application Serial No. 200880123674.3, dated May 24, 2012, 8 pages.

Office Action for U.S. Appl. No. 12/338,768, dated Aug. 28, 2012, 15 pages.

International Search Report and Written Opinion for PCT/US2009/002942 dated Sep. 11, 2009, 9 pages.

International Search Report and Written Opinion for PCT/US2008/013623, dated Mar. 6, 2009, 9 pages.

Office Action for European Patent Application Serial No. 09 762 821.8 dated Nov. 15, 2013, 6 pages.

Office Action for Chinese Patent Application Serial No. 2009801220788, dated Oct. 17, 2012, 13 pages.

Office Action for European Patent Application Serial No. 08 866 064.2, dated Dec. 13, 2012, 6 pages.

Office Action for U.S. Appl. No. 12/157,846, dated Jan. 14, 2013, 12 pages.

Office Action for U.S. Appl. No. 12/338,768, dated Jan. 29, 2013, 18 pages.

Office Action for Chinese Patent Application Serial No. 200980122078.8 dated Jun. 21, 2013, 12 pages.

Office Action for U.S. Appl. No. 12/338,768 dated Jul. 17, 2013, 15 pages.

Office Action for Chinese Patent Application Serial No. 200980122078.8 dated Dec. 10, 2013, 8 pages.

Office Action for U.S. Appl. No. 12/338,768 dated Dec. 3, 2013, 16 pages.

* cited by examiner

Sequence 1:

Sequence 2:

Fig. 4

Music
    Channel 1
        Track 1
        Track 2
        Track 3
        Track 4
        Track 5
        Track 6
        ...
        Track N
    Channel 2
        Track 1
        Track 2
        Track 3
        Track 4
        Track 5
        Track 6
        ...
        Track N
    Channel 3
        Track 1
        Track 2
        Track 3
        Track 4
        Track 5
        Track 6
        ...
        Track N
Playlists
    Channel 1
        Playlist 1
        Playlist 2
        Playlist 3
        Playlist 4
        Playlist 5
    Channel 2
        Playlist 1
        Playlist 2
        Playlist 3
        Playlist 4
        Playlist 5
    Channel 3
        Playlist 1
        Playlist 2
        Playlist 3
        Playlist 4
        Playlist 5

METHOD FOR PLAYING DIGITAL MEDIA FILES WITH A DIGITAL MEDIA PLAYER USING A PLURALITY OF PLAYLISTS

BACKGROUND

Several services, such as Slacker Portable and Rhapsody Channels, emulate a radio-like listening experience on a portable digital audio player by allowing users to select different channels of music. Such services offer a user the ability to listen (with some restrictions) to a large pool of content at a price lower than if the user purchased each individual song. In operation, such services cache a plurality of songs along with a playlist or other mechanism that specifies a predetermined play order of the songs. These services use one playlist per channel. The play order in each channel is typically established by a professional curator to create a radio-like listening experience. Although the number of songs stored on the portable digital audio player can be relatively large, over time, the user will reach the end of the playlist. If the playlist for a channel were simply repeated, the experience may become stale and lead to a repetitive, non-radio-like experience. While randomizing the playback of the songs would keep the experience fresh, randomization can result in inappropriate songs being juxtaposed in time. Randomization can also lead to a strange listening experience, such as when two "station ID drops" are played in a row. Accordingly, a user may be required to connect his device to the Internet to download a new set of songs and a new playlist to keep the listening experience fresh while avoiding the problems discussed above. However, connecting to a network may be inconvenient or complicated for some users.

SUMMARY

The present invention is defined by the claims, and nothing in this section should be taken as a limitation on those claims.

By way of introduction, the embodiments described below provide methods for playing digital media files with a digital media player using a plurality of playlists. In one embodiment, a digital media player comprises a memory storing a plurality of digital media files and a plurality of playlists, wherein each playlist specifies a predetermined play order of at least some of the plurality of digital media files and is created by a curator. While offline, the digital media player selects a first playlist from the plurality of playlists, plays the digital media files specified in the first playlist, and, after playing the digital media files specified in the first playlist, selects a second playlist from the plurality of playlists.

In another embodiment, a digital media player comprises a memory storing a plurality of digital media files and a plurality of playlists, wherein each playlist specifies a predetermined play order of at least some of the plurality of digital media files, wherein at least one playlist in the plurality of playlists specifies at least one digital media file that is not specified by another playlist in the plurality of playlists. While offline, the digital media player selects a first playlist from the plurality of playlists, plays the digital media files specified in the first playlist, and, after playing the digital media files specified in the first playlist, selects a second playlist from the plurality of playlists.

In yet another embodiment, a digital media player comprises a memory storing a plurality of digital media files, a first plurality of playlists associated with a first channel, and a second plurality of playlists associated with a second channel, wherein each playlist specifies a predetermined play order of at least some of the plurality of digital media files. While offline, the digital media player receives a user-selection of one of the first and second channels, selects a first playlist from the plurality of playlists associated with the selected channel, plays the digital media files specified in the first playlist, and, after playing the digital media files specified in the first playlist, selects a second playlist from the plurality of playlists associated with the selected channel.

Other embodiments are disclosed, and each of the embodiments can be used alone or together in combination. The embodiments will now be described with reference to the attached drawings.

DETAILED DESCRIPTION OF THE PRESENTLY PREFERRED EMBODIMENTS

Introduction

By way of introduction, the following embodiments address the problems described above of keeping a radio-like listening experience fresh without requiring a user to connect his digital media player to the Internet. One embodiment uses a plurality of playlists—instead of a single playlist—to reference a given pool of digital media files. After the songs of one playlist have been played, another playlist is selected, and songs from that playlist are played. Since the playlist selection is automatically made by the digital media player while it is offline, a fresh listening experience is created without requiring the user to connect the digital media player to the Internet. Preferably, each playlist is purposefully curated to ensure that the play order keeps the experience commensurate with a particular brand message.

Before turning to these and other embodiments, a general overview of exemplary digital media players is provided.

Exemplary Digital Media Players

In general, a digital media player is a device having a memory (either embedded or removable (e.g., a removable memory card)) that stores digital media files and circuitry for playing those files. The digital media player can comprise other components, such as, but not limited to, a display device, an audio output jack, a speaker, and a wireless transceiver. The memory in the digital media player can take any suitable form, such as, but not limited to, a non-volatile solid-state memory (e.g., flash memory, NAND memory, and multi-level cell ("MLC") memory), optical memory, and magnetic memory. As used herein, "circuitry" can include one or more components and can be a pure hardware implementation and/or a combined hardware/software (or firmware) implementation. Accordingly, "circuitry" can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. In addition to being operative to play digital media files, the circuitry can be operative to perform other functions, such as, but not limited to, communicating with a host device via a wired or wireless connection, recording digital media files, and managing the operation of the digital media player. While the digital media player can be a device dedicated to playing digital media, it can also be a device that performs various other functions, in which case the circuitry in the player can also be operative to perform those other functions. For example, a digital media player can be part of a mobile phone, a game device, a personal digital assistant (PDA), an email/text messaging device, a digital camera, a personal navigation system (PND), and a mobile Internet device (MID).

Digital media can take any suitable form, such as, but not limited to, audio (e.g., a song, spoken word, a podcast, one or a series of sounds, etc.), video (with or without accompanying audio) (e.g., a movie, an episode of a TV show, a news program, etc.), still or moving images (e.g., a photograph, a computer-generated display, etc.), text (with or without graphics) (e.g., an article, a text file, etc.), and a hybrid multimedia presentation of two or more of these forms. For simplicity, in the following embodiments, the digital media player will take the form of a portable digital audio player. Again, a digital audio player is just one of the many forms a digital media player can take, and the claims should not be read as requiring a digital audio player unless that term is explicitly used therein. Accordingly, these embodiments can be adapted for use with other types of digital media (e.g., digital video).

Figure 1:
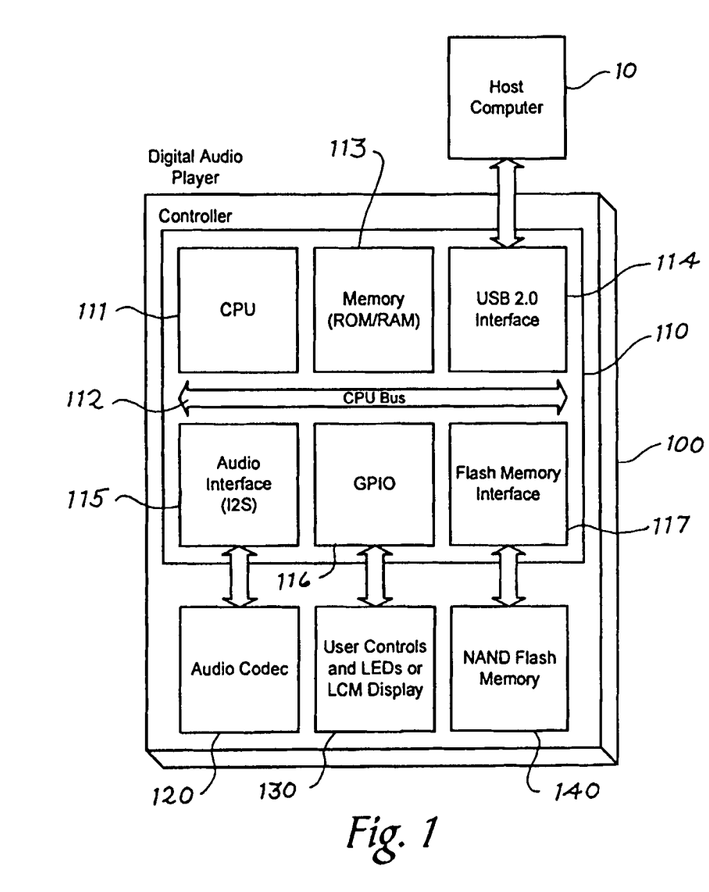
FIG. 1 is a block diagram of a digital media player of an embodiment with embedded memory.

Turning now to the drawings, FIG. 1 is an illustration of a portable digital audio player 100 of an embodiment. As shown in FIG. 1, the digital audio player 100 comprises a controller 110, which, in this embodiment, comprises a central processing unit (CPU) 111 and a CPU bus 112 that places the CPU 111 in communication with several other components in the controller 110: memory (ROM/RAM) 113 (preferably a combination of ROM, SRAM, and 1TSRAM, which is similar to DRAM) that stores computer-readable program code (e.g., firmware) executable by the CPU 111 to run the digital audio player 100, a USB 2.0 interface 114 operative to place the digital audio player 100 in communication with a host computer 10, an audio interface 115 (e.g., an I2S interface), general purpose input-output (GPIO) circuitry 116, and a flash memory interface 117. The digital audio player 100 also comprises an audio codec 120, user controls and LEDs or LCM display 130, and an embedded NAND flash memory 140. (While the memory 140 is shown as a single component in FIG. 1, it should be understood that several separate memory components can be used.) The audio codec 120 is in communication with the audio interface 115 and provides audio output through a headphone jack or speakers (not shown). The user controls and LEDs or LCM display 130 provide a user interface through which a user can control the operation of the digital audio player 100 through the GPIO 116, and the NAND flash memory 140 stores digital audio files that the controller 110 receives via the flash memory interface 117 and plays through the audio interface 115 and the audio codec 120.

In this embodiment, the digital audio player 100 receives digital audio files from the host computer 10 in communication with the digital audio player 100 via the USB 2.0 interface 114. As used herein, the phrase "in communication with" means directly in communication with (e.g., through a wired or wireless connection) or indirectly in communication with through one or more components, which may or may not be shown or described herein.) The digital audio player 100 and the host computer 10 can have mating ports, or a cable or cradle can be used to connect the digital audio player 100 with the host computer 10, which downloads digital content to the embedded NAND flash memory 140 in the player 100. The source of the digital audio files can be the host computer 10 itself or an external location in communication with the host computer 10 via a network, such as the Internet.

Figure 2:
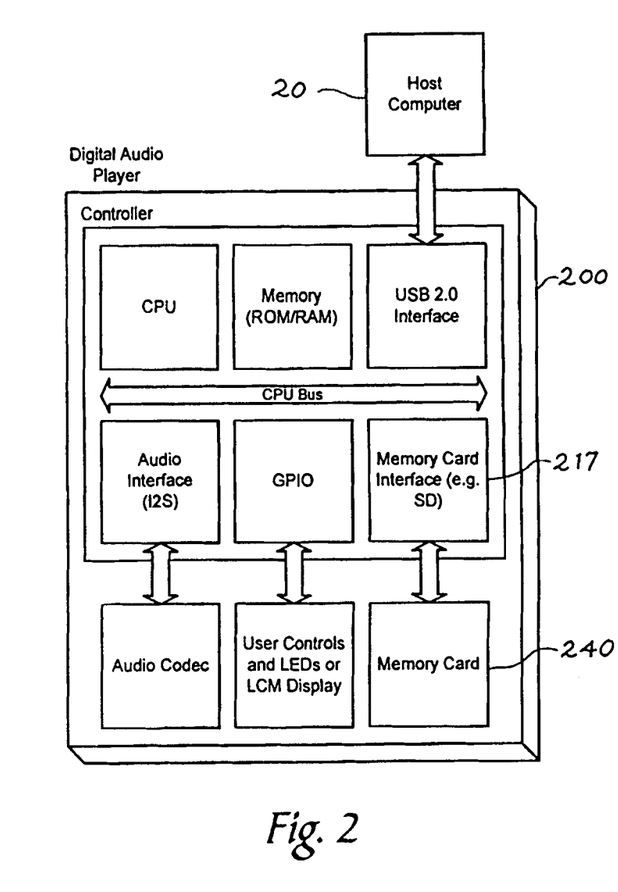
FIG. 2 is a block diagram of a digital media player of an embodiment with a removable memory card.

It should be noted that the digital audio player 100 shown in FIG. 1 is merely one example of a digital audio player, and variations to the components shown in FIG. 1 can be used. For example, in an alternate digital audio player 200 shown in FIG. 2, the flash memory interface 117 and the embedded NAND flash memory 140 are replaced by a memory card interface 217 (e.g., an SD card interface) and a memory card 240 received by the digital audio player 200 via a memory card slot (not shown). In this embodiment, digital audio files can be presented to the digital audio player 200 via a removable memory card 240 instead of or in addition to downloading digital audio files from the host computer 20. In yet another alternative, a digital audio player can have both embedded memory and a removable memory card. Further, instead of the digital audio player having a wired connection to the host computer, the digital audio player can have a wireless transceiver to place the digital audio player in communication with the host computer. With a wireless transceiver, the digital audio player can directly communicate with a networked component without the need to use the host computer. Further, in other embodiments, the digital audio player merely has a memory card slot and does not have a connection to a host device or network. As yet another variation, as indicated in FIGS. 1 and 2, the digital audio player 100, 200 can either have a display device (e.g., an LCM display) or simple LEDs to provide some visual feedback to the user. In an alternate embodiment, neither a display device nor LEDs are used.

With an overview of exemplary digital media players now presented, the following paragraphs will describe the embodiments related to the use of multiple playlists. For simplicity, these embodiments will be described in conjunction with the digital audio player 200 of FIG. 2. However, it should be noted that the digital audio player 100 of FIG. 1, as well as other types of digital media players, can be used with these embodiments.

Use of Multiple Playlists

As discussed above, using multiple playlists—instead of a single playlist—to reference a given, fixed pool of digital media files can keep a premium-curated experience fresh without requiring a user to connect his digital media player to the Internet. In operation, the digital media player 200 selects a first playlist from a plurality of playlists stored in the memory card 240 and plays the digital media files specified in the first playlist. (The first playlist can be an initial, default playlist.) After playing the digital media files specified in the first playlist from beginning to end, the digital media player 200 selects a second playlist from the plurality of playlists. (As will be discussed in more detail below, the second playlist is not necessarily the next playlist in the sequence.) This process continues as each of the playlists is played. Because this process takes place while the digital media player 200 is offline, the use of multiple playlists provides a fresh, radio-like listening experience without requiring the digital media player 200 to go online after it plays all of the content specified by a single playlist. As used herein, "offline" refers to the fact that the digital media player 200 performs the above acts without being connected to another device that provides the digital media player 200 with a new playlist (e.g., without being connected to a stand-alone device or a device accessible via a network, such as the Internet, that stores and provides new playlist(s)).

Although any number of playlists can be used, it is presently preferred that at least three (and, even more preferably, at least five) playlists be used to provide an optimal listening experience. Further, it is presently preferred that each playlist be created by a curator to help ensure that the play order of each playlist is commensurate with a particular brand message. As used herein, a "curator" is some entity other than the user of the digital media player 200 and can be a human (e.g., a professional DJ), an automated entity (e.g., an algorithm), or a combination of human and automated entities. Accordingly, playlist curation can be a manual, semi-automatic, or automatic process.

It should be noted that a playlist can take any suitable form. In one embodiment, a playlist takes the form of a file that is separate from the digital audio files and contains the track locations, in order, for all the songs to be played. Any suitable playlist format can be used. For example, the following is a sample playlist in XML format for the playback of three songs, encoded in three different formats (OGG, FLAC, and MP3) that are all located in the subdirectory "music."

```
xml version="1.0" encoding="UTF-8"?>
<playlist version="1" xmlns="http://xspf.org/ns/0/">
<trackList>
<track><location>file:///music/song_1.ogg</location></track>
<track><location>file:///music/song_2.flac</location></track>
<track><location>file:///music/song_3.mp3</location></track>
</trackList>
</playlist>
```

Of course, other formats of playlists can be used, such as, but not limited to, m3u.

Composition of Playlists

Figure 3:
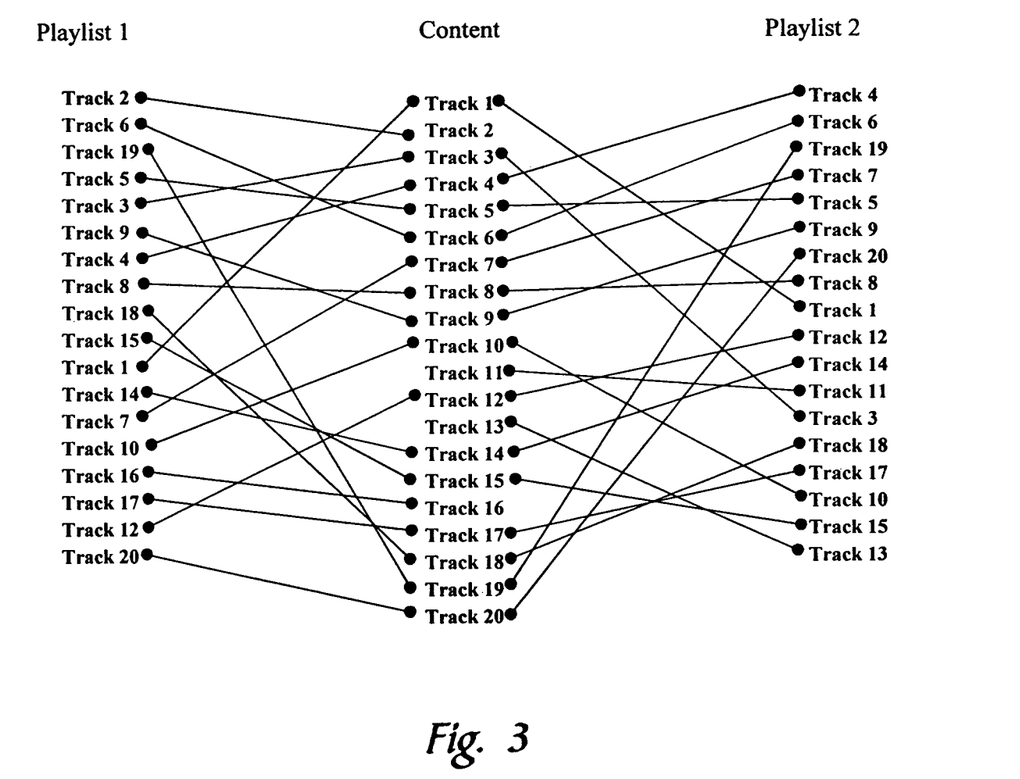
FIG. 3 is an illustration of an embodiment in which a first playlist specifies at least one digital media file that is not specified by a second playlist.

Each of the playlists can specify the stored digital audio files in any desired fashion. For example, in one embodiment, each playlist specifies the same digital audio files as all the other playlists but sequences those digital audio files in a different predetermined play order. So, if the memory card 240 stores 800 songs, each playlist would contain all 800 songs but in a different play order. In another embodiment, at least one playlist specifies a digital media file that is unique to that playlist and is not specified by any other playlist. This embodiment is shown in more detail in FIG. 3. As shown in FIG. 3, the memory card 240 stores 20 tracks of songs and has two playlists: Playlist 1 and Playlist 2. (20 tracks have been chosen to simplify this illustration. In practice, a far greater number of songs and playlists can be used.) In this embodiment, both Playlist 1 and Playlist 2 specify 18 tracks (although each playlist can specify a different number of tracks). However, instead of specifying the same 18 tracks, each playlist contains 14 tracks that are common to both playlists (such as Tracks 1, 3, 19, and 20) and four tracks that are unique to the playlist (such as Track 2 for Playlist 1 and Track 11 for Playlist 2). Accordingly, in addition to a different play order of the common tracks, each playlist varies to some degree in terms of track content because the database of audio content contains more tracks than are present in a single instance of a given playlist. The combination of different play order and slightly different content makes the listening experience of each playlist somewhat unique. However, since most tracks are still shared, a compact implementation is still provided.

Of course, as discussed above, playlists can be used without the notion of unique tracks, where the playlists specify exactly the same tracks but sequence those tracks in a different play order. That is, the database of audio content in the memory card 240 does not need to contain more audio objects than are contained in a given playlist. As can be seen from the above, playlists with different play orders (and, optionally, unique tracks) can be created from a single collection of audio tracks. With sufficient unique playlists, a curated listening experience that is seemingly ongoing without repetition can be created, where once one playlist is exhausted, another playlist is selected.

Playlist Selection

Figure 4:
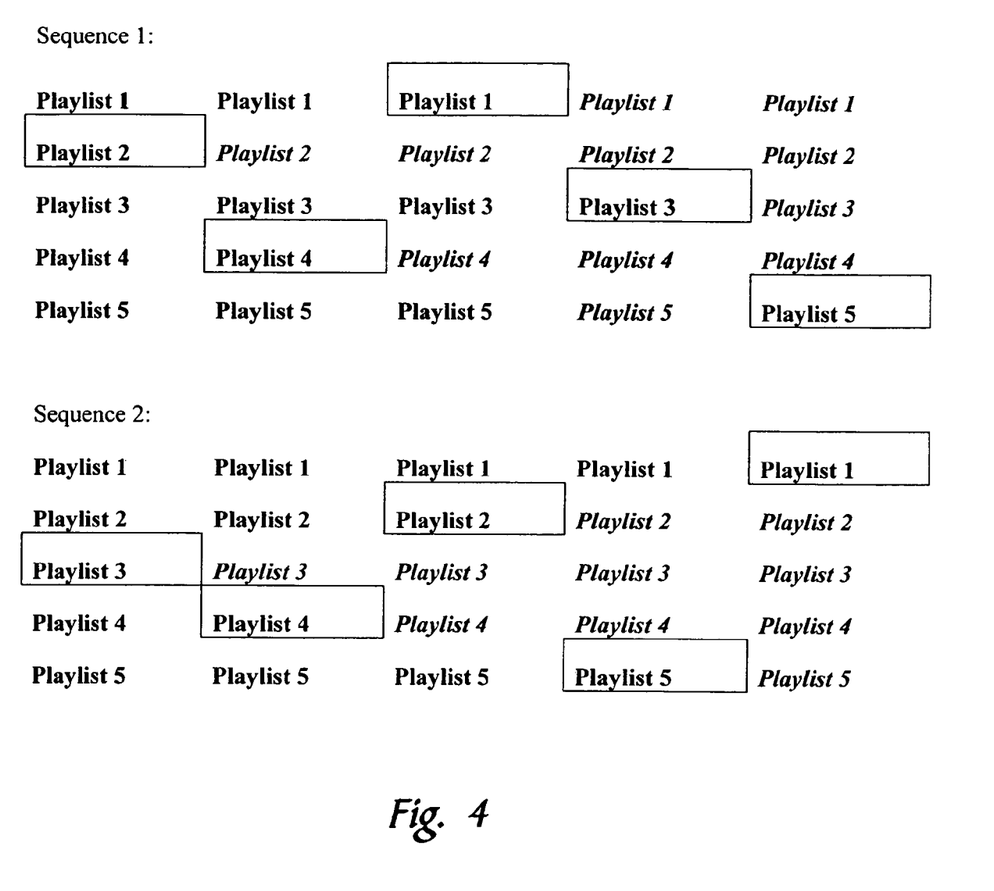
FIG. 4 is an illustration of an embodiment in which a random algorithm is used to select a playlist.

As discussed above, after one playlist is exhausted, the digital media player 200 selects another playlist that references those digital media files to provide a fresh, radio-like listening experience without requiring the digital media player 200 to go online after playing all of the content specified by a single playlist. The digital audio player 200 can automatically select the playlist in any suitable manner. For example, in one embodiment, the digital audio player 200 selects the playlists, one at a time, in the sequence in which they are stored (e.g., Playlist 1, then Playlist 2, then Playlist 3, etc.). In other embodiments, the digital audio player 200 selects playlists in a random or pseudo-random fashion for an even more unique listening experience. There are many random or pseudo-random algorithms that can be used. For example, a random seed can be used to determine which playlist should be played first. The remaining playlists can then be played under the control of a pseudo-random number generator, with each playlist being eliminated from future playback until all playlists have been played. A new random seed can be used for the next sequence followed by another sequence of random playlist selection. FIG. 4 exemplifies how this can be done with the outline boxes indicating selected playlists and the italicized playlists shown as being eliminated from playback selection until all playlists have been played. This mechanism will give a repeatable sequence for each starting point. To add further variation, multiple pseudo-random sequence generators can be employed so that the sequence will vary even when the same initial playlist is selected. While limited random or pseudo-random playlist order selection is preferred in this embodiment, the randomization of playlist selection can be controlled in a number of other ways, such as true random selection with or without repeat limitations. However, it may be preferred to ensure that the randomization does not allow the selection of a given playlist immediately (or at some time) after its playback has been completed.

Use of Channels

Figure 5:
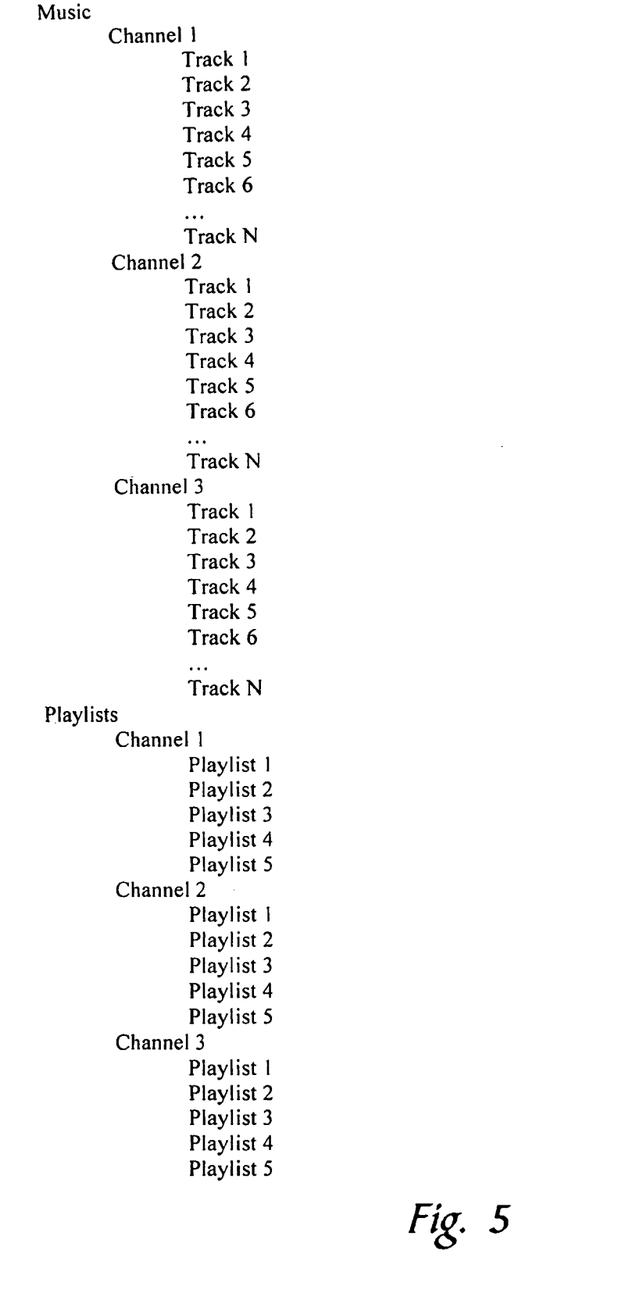
FIG. 5 is an illustration of a sample representation of a file system of an embodiment using multiple channels.

Turning now to another embodiment, to make the listening experience even more radio-like, the digital audio player 200 can have the ability to switch to different "channels," wherein each channel is associated with its own plurality of playlists (i.e., a first channel is associated with a first plurality of playlists, a second channel is associated with a second plurality of playlists, etc.). (The experience is "more radio-like" in terms of the concept of channels and the order in which the songs are programmed, but the experience is actually much more powerful since it allows instant access to vast amounts of music in a compelling manner that stays fresh and unpredictable and, unlike radio, can be paused and skipped in some embodiments.) Two channels can have unique tracks, such that there is no overlap in songs, or two channels can share at least one track between them. FIG. 5 is an illustration of a sample representation of a file system of an embodiment using multiple channels. As shown in FIG. 5, at the root directory, there are two subdirectories: one for the music channels and one for playlists. Note that this representation is for exemplary purposes only, as the playlists can be located anywhere in the file system and specify any location within the file system for the audio tracks. Accordingly, any number of different file system configurations are possible.

Figure 6:
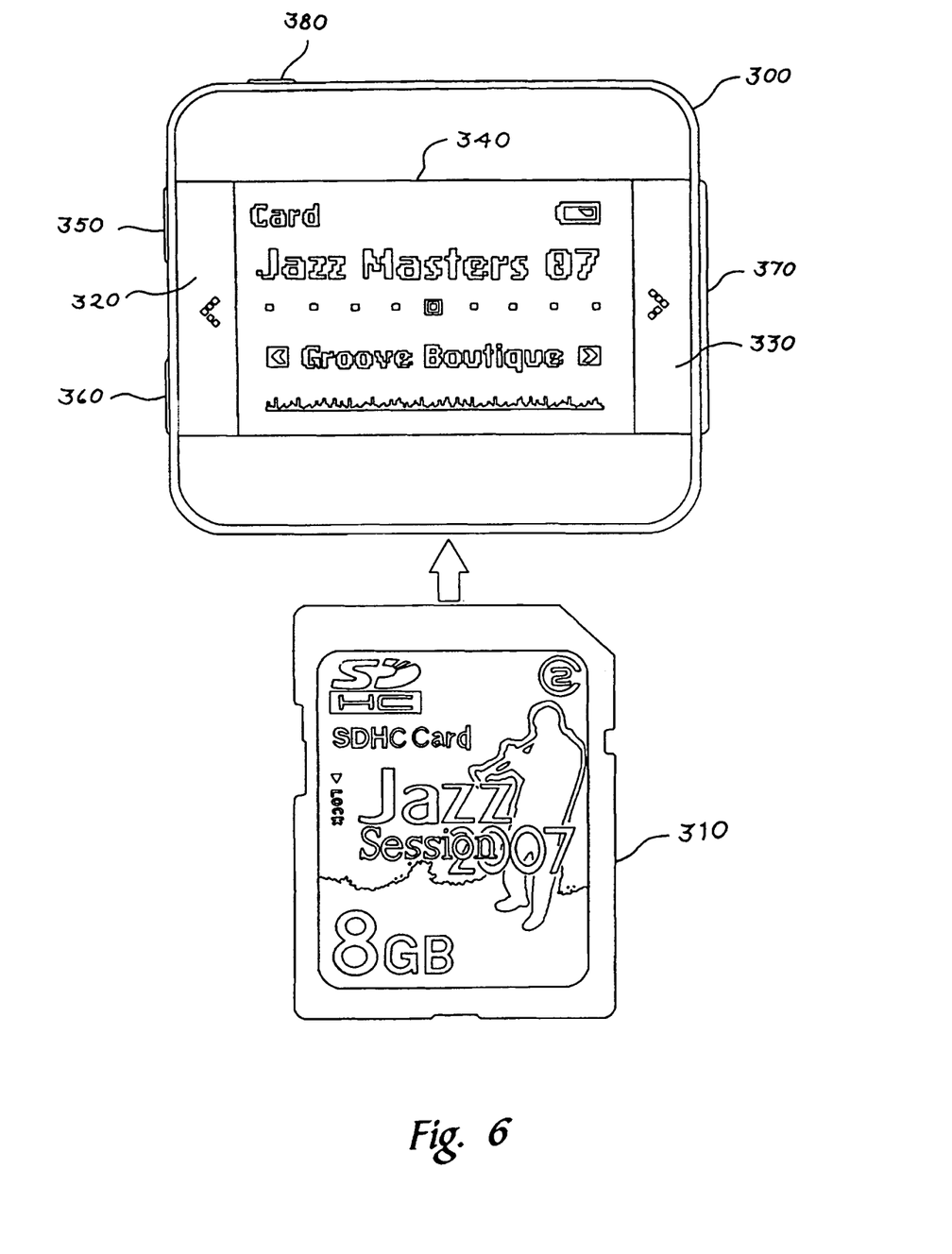
FIG. 6 is an illustration of a digital media player of an embodiment.

A digital audio player can provide any suitable type of mechanism for the selection of channels. For example, a digital audio player can comprise a next channel user input element and a previous category user input element. Such a digital audio player 300 is shown in FIG. 6. In this embodiment, a memory card 310 comprising a solid-state memory is used to provide digital audio files and playlists to the digital audio player 300 via a memory card slot (not visible in FIG. 6) on the bottom side of the player 300. (As mentioned above, instead of or in addition to using a memory card 310, the digital audio player 300 can receive digital audio files from a host computer and/or a network location.) As indicated on the label of the memory card 310, the memory card 310 stores jazz songs. While all the songs on the memory card 310 are jazz songs, the jazz songs on the memory card 310 are grouped into a plurality of channels (e.g., "Groove Boutique," "Classic Jazz," and "Modern Jazz"). Accordingly, as seen by this example, a "channel" is not necessarily a different genre of music but is merely associated with a different plurality of playlists.

As shown in FIG. 6, the digital audio player 300 has two user input elements (here, left arrow button 320 and right arrow button 330) that allows a user to select a channel of content. (The user input elements can take other forms, such as, but not limited to, a wheel, a lever, a switch, a knob, or a touch-sensitive element.) The two buttons 320, 330 act as "change channel" buttons, with the left arrow button 320 indicating "previous channel" and the right arrow button 330 indicating "next channel." When the circuitry in the digital audio player 300 receives a user selection of the left arrow button 320, it selects the previous channel and plays a digital media file specified by the playlist associated with that channel. Consider, for example, a memory card 310 that has three channels ("Groove Boutique," "Classic Jazz," and "Modern Jazz" (of course, the memory card 310 can have more or fewer channels)), and the digital audio player 300 is currently playing a song from the "Classic Jazz" channel. When the circuitry in the digital audio player 300 receives a user selection of the left arrow button 320, it selects the previous channel, which, in this card, is "Groove Boutique," and plays a digital audio file specified by the playlist associated with that channel. A similar operation would occur when the user presses the right arrow button 330, but the digital audio player 300 would play a song specified by a playlist associated with the next channel (e.g., "Modern Jazz") instead of the previous channel (e.g., "Groove Boutique"). Accordingly, a user can select a channel with the press of a single button, much like the user's experience with pressing a previous channel or next channel button on an FM radio.

While the digital audio player 300 in this embodiment has both a previous channel button 320 and a next channel button 330, the digital audio player 300 can instead have only one (instead of both) of these buttons. Further, instead of or in addition to having a next and/or previous channel button, the digital audio player 300 can have dedicated user input elements that are configured to correspond to respective channels. Also, although not required, as shown in FIG. 6, the digital audio player 300 can provide other elements to enhance a user's experience with the player 300. For example, the digital audio player 300 in FIG. 6 comprises a display device 340 that displays the current channel being played, as well as other information, for a richer experience. The digital audio player 300 also comprises additional user interface buttons such as a volume-up button 350, a volume-down button 360, a "skip song" button 370 (this player 300 does not have a "previous song" button, but one could be added), a switch 380 to select between "off," "card," and "FM" modes of operation. (In this embodiment, the digital audio player 300 also has an FM radio receiver. When in "FM" mode, the left arrow button 320 and the right arrow button 330 can scan up and down the dial.)

As mentioned above, services can offer a user the ability to listen to a large pool of content at a price lower than if the user purchased each individual song. However, as a trade-off, there may be some restrictions placed on user's ability to freely "use" the songs. For example, the digital audio player 300 of FIG. 6 only allows the user to skip a song but not to replay a song. Other restrictions can apply, such as, but not limited to, not allowing the user to browse through the content, not allowing the user to search for a song, not allowing the user to see the names of the artists and songs in a channel at will, not allowing a user to select a random song, and not allowing a user to create his own playlist.

Memory Device Implementation

In one presently preferred embodiment, both the digital media files and the plurality of playlists are stored in memory of a removable memory device (e.g., in memory of a memory card), which has a connector configured to be connected with a digital media player., and the circuitry in the digital media player is operative to automatically select the playlists as described above. If the playback of a playlist is interrupted (e.g., by a play/pause sequence, by a power off/on sequence, or by selecting another channel, which will be described below), it is preferred that a "bookmark" be written to the memory card so that when playback of the playlist is resumed, the playlist starts from the point where it left off.

Preferably, the digital media files and playlists (and bookmarks) are stored in a secure fashion to prevent unauthorized use or tampering. In a presently preferred embodiment, a TrustedFlash™ architecture from SanDisk Corporation is used to store the digital media files and playlists in a hidden partition on the memory card 240. Further information about TrustedFlash™ can be found in U.S. patent application Ser. No. 11/314,411 (published as U.S. patent publication 2006/0242068A1), Ser. Nos. 11/557,028, and 11/322,812 (published as U.S. patent publication 2007/0043667A1), which are assigned to the assignee of the present application and hereby incorporated by reference. Preferably, although not required, in this embodiment, the memory card 240 does not contain a general library of digital audio files outside of the files referenced by the playlists.

Figure 7:
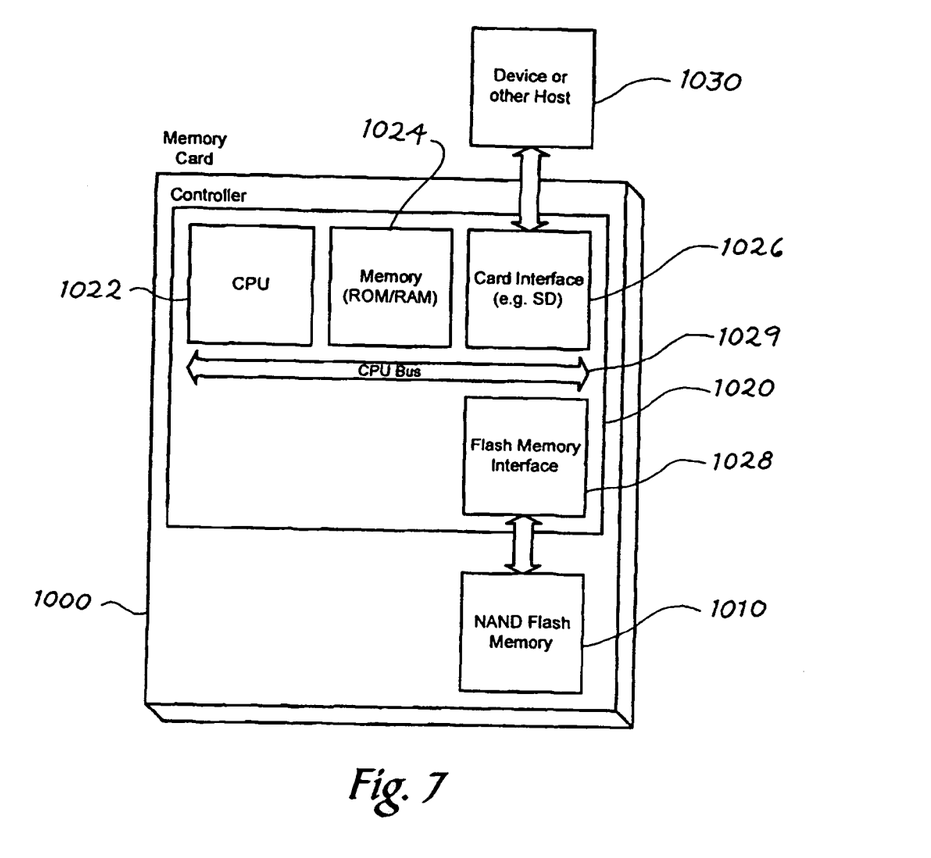
FIG. 7 is an illustration of a memory card of an embodiment.

Any suitable type of memory card (or, more generally, memory device (e.g., USB drive, etc.) can be used. FIG. 7 is an illustration of an exemplary memory card 1000. As shown in FIG. 7, the memory card 1000 comprises a memory 1010 and a controller 1020. In this embodiment, the memory 1010 takes the form of NAND flash memory composed of erasable blocks of nonvolatile cells that are readable and programmable in smaller units of pages, although other memory types can be used. The controller 1020 is preferably implemented as a single integrated circuit that may or may not be packaged with the NAND memory 1010. The controller 1020 comprises a CPU 1022, a memory (ROM/RAM) 1024, a card interface (e.g., SD) 1026, a flash memory interface 1028, and a CPU bus 1029. The controller 1020 is responsible for translating requests for data transfers from a host 1030 (e.g., a digital audio player), which are generally of read or write variety and specify a starting logical block address and a number of blocks to transfer.

Storing both the digital media files and the plurality of playlists that reference the digital media files on a removable memory card allows a business model to be employed in which preloaded cards are sold to end users. Although memory cards that contain pre-loaded content are already available (e.g., such as those that store one or more albums by an artist), such memory cards do not have multiple playlists that reference the same database of content. Accordingly, such cards do not provide the fresh, radio-like listening experience that can be provided when a plurality of playlists are used.

Of course, as mentioned above, digital media files and/or playlists can be provided to a digital media player other than via a removable memory card. For example, digital media files and/or playlists can be loaded from a host computer or indirectly or directly from the Internet. Further, a mixed-use case can be provided, whereby digital media files and/or playlists are initially provided to the digital media player via a removable memory card, and, later, updated (or "refreshed") digital media files and/or playlists are provided via a host device or network connection.

Conclusion

It should be noted that any of these embodiments can be used alone or in various combinations. For example, an embodiment in which at least one playlist in the plurality of playlists specifies at least one unique track can be used together or separately from embodiments in which the playlists are curated and/or with embodiments with multiple channels. Further, the following U.S. patent application, which is hereby incorporated by reference and assigned to the assignee of the present application, describes various embodiments which can also be used in combination with any of the embodiments described here: "Powerfully Simple Digital Media Player and Methods for Use Therewith," U.S. patent application Ser. No. 11/967,861, filed Dec. 31, 2007.

Also, it is intended that the foregoing detailed description be understood as an illustration of selected forms that the invention can take and not as a definition of the invention. It is only the following claims, including all equivalents, that are intended to define the scope of this invention. Also, some of the following claims may state that a component is operative to perform a certain function or configured for a certain task. It should be noted that these are not restrictive limitations. It should also be noted that the acts recited in the claims can be performed in any order—not necessarily in the order in which they are recited.

What is claimed is:

1. A method for playing digital media files with a digital media player using a plurality of playlists, the method comprising:
   in a digital media player comprising a connector configured to be removably connected with a memory device comprising a controller and a memory pre-loaded with a plurality of digital media files and a plurality of playlists, wherein the plurality of digital media files and playlists are provided to the digital media player via the memory device without requiring a connection to a network, wherein each playlist specifies a predetermined play order of at least some of the plurality of digital media files and is created by a curator, wherein the curator is an entity other than a user of the digital media player, performing the following while the digital media player is offline:
   selecting a first playlist from the plurality of playlists;
   playing the digital media files specified in the first playlist; and
   after playing the digital media files specified in the first playlist, selecting a second playlist from the plurality of playlists;
   wherein the selecting and playing of multiple playlists are performed while the digital media player is off-line, thus providing a radio-like listening experience without requiring a connection to a network.

2. The method of claim 1, wherein the second playlist is a next playlist after the first playlist in the plurality of playlists.

3. The method of claim 1, wherein the second playlist is selected in a random fashion from the plurality of playlists.

4. The method of claim 1, wherein the second playlist is selected in a pseudo-random fashion from the plurality of playlists.

5. The method of claim 1, wherein at least one playlist in the plurality of playlists specifies at least one digital media file that is not specified by another playlist in the plurality of playlists.

6. The method of claim 1, wherein at least two playlists in the plurality of playlists specify the same digital media files but sequence those digital media files in a different predetermined play order.

7. The method of claim 1, wherein the plurality of playlists are associated with a first channel, wherein the memory further stores a second plurality of playlists associated with a second channel, and wherein the method further comprises receiving a user-selection of one of the first and second channels.

8. The method of claim 7, wherein the first channel and the second channel share at least one of the plurality of digital media files.

9. The method of claim 7, wherein the memory further stores at least one additional digital media file that is unique to the second channel and is not specified in any of the playlists associated with the first channel.

10. The method of claim 7, wherein the user-selection of the one of the first and second channels is received by receiving a user-selection of a user input element of the digital media player.

11. The method of claim 10, wherein the user input element comprises at least one of a next channel user input element and a previous channel user input element.

12. The method of claim 1, wherein the digital media files comprise digital audio files.

13. A method for playing digital media files with a digital media player, the method comprising:
   in a digital media player comprising a connector configured to be removably connected with a memory device comprising a controller and a memory pre-loaded with a plurality of digital media files and a plurality of playlists, wherein the plurality of digital media files and playlists are provided to the digital media player via the memory device without requiring a connection to a network, wherein each playlist specifies a predetermined play order of at least some of the plurality of digital media files, and wherein at least one playlist in the plurality of playlists specifies at least one digital media file that is not specified by another playlist in the plurality of playlists, performing the following while the digital media player is offline:
   selecting a first playlist from the plurality of playlists;
   playing the digital media files specified in the first playlist; and after playing the digital media files specified in the first playlist, selecting a second playlist from the plurality of playlists;

wherein the selecting and playing of multiple playlists are performed while the digital media player is off-line, thus providing a radio-like listening experience without requiring a connection to a network.

14. The method of claim 13, wherein each playlist is created by a curator.

15. The method of claim 13, wherein the second playlist is a next playlist after the first playlist in the plurality of playlists.

16. The method of claim 13, wherein the second playlist is selected in a random fashion from the plurality of playlists.

17. The method of claim 13, wherein the second playlist is selected in a pseudo-random fashion from the plurality of playlists.

18. A method for playing digital media files with a digital media player, the method comprising:

in a digital media player comprising a connector configured to be removably connected with a memory device comprising a controller and a memory pre-loaded with a plurality of digital media files, a first plurality of playlists associated with a first channel, and a second plurality of playlists associated with a second channel, wherein the plurality of digital media files and the playlists are provided to the digital media player via the memory device without requiring a connection to a network, wherein each playlist specifies a predetermined play order of at least some of the plurality of digital media files, performing the following while the digital media player is offline:

receiving a user-selection of one of the first and second channels;

selecting a first playlist from the plurality of playlists associated with the selected channel;

playing the digital media files specified in the first playlist; and after playing the digital media files specified in the first playlist, selecting a second playlist from the plurality of playlists associated with the selected channel;

wherein the selecting and playing of multiple playlists are performed while the digital media player is off-line, thus providing a radio-like listening experience without requiring a connection to a network.

19. The method of claim 18, wherein each playlist is created by a curator.

20. The method of claim 18, wherein the second playlist is a next playlist after the first playlist in the plurality of playlists associated with the selected channel.

21. The method of claim 18, wherein the second playlist is selected in a random fashion from the plurality of playlists associated with the selected channel.

22. The method of claim 18, wherein the second playlist is selected in a pseudo-random fashion from the plurality of playlists associated with the selected channel.

23. The method of claim 18, wherein at least one playlist in the plurality of playlists associated with the selected channel specifies at least one digital media file that is not specified by another playlist in the plurality of playlists associated with the selected channel.

24. The method of claim 18, wherein at least two playlists in the plurality of playlists associated with the selected channel specify the same digital media files but sequence those digital media files in a different predetermined play order.

25. The method of claim 18, wherein the first channel and the second channel share at least one of the plurality of digital media files.

26. The method of claim 18, wherein the memory further stores at least one additional digital media file that is unique to the second channel and is not specified in any of the playlists associated with the first channel.

27. The method of claim 18, wherein the user-selection of the one of the first and second channels is received by receiving a user-selection of a user input element of the digital media player.

28. The method of claim 27, wherein the user input element comprises at least one of a next channel user input element and a previous channel user input element.

29. A memory device comprising:

a connector configured to be removably connected with a digital media player;

a memory pre-loaded with a plurality of digital media files and a plurality of playlists, wherein by being pre-loaded, a user is not required to write the plurality of digital media files and the plurality of playlists onto the memory device, wherein each playlist specifies a predetermined play order of at least some of the plurality of digital media files and is created by a curator, wherein the curator is an entity other than the user of the digital media player; and a controller in communication with the connector and the memory, wherein the controller is configured to:

provide a first playlist from the plurality of playlists to the digital media player in response to a request from the digital media player; and provide a second playlist from the plurality of playlists to the digital media player in response to a request from the digital media player after the digital media player plays the digital media files specified in the first playlist;

wherein the first and second playlists are provided while the digital media player is off-line, thus providing a radio-like listening experience without requiring a connection to a network.

30. The memory device of claim 29, wherein the memory comprises a hidden partition and a public partition, and wherein the plurality of digital media files and plurality of playlists are stored in the hidden partition.

31. The memory device of claim 29, wherein the memory device comprises a memory card.

32. The memory device of claim 29, wherein by being created by the curator, each playlist is commensurate with a particular brand message.

33. The memory device of claim 29, wherein after playing all of the digital media files of one playlist, the digital media player plays the digital media files of an additional playlist.

34. The memory device of claim 29, wherein the plurality of playlists include a first plurality of playlists associated with a first user-selectable channel and a second plurality of playlists associated with a second user-selectable channel.

35. A memory device comprising:

a connector configured to be removably connected with a digital media player;

a memory pre-loaded with a plurality of digital media files and a plurality of playlists, wherein by being pre-loaded, a user is not required to write the plurality of digital media files and the plurality of playlists onto the memory device, wherein each playlist specifies a predetermined play order of at least some of the plurality of digital media files, and wherein after playing all of the digital media files of one playlist, the digital media player plays the digital media files of an additional playlist; and a controller in communication with the connector and the memory, wherein the controller is configured to:

provide a first playlist from the plurality of playlists to the digital media player in response to a request from the digital media player; and provide a second playlist from the plurality of playlists to the digital media player in response to a request from the digital media player after the digital media player plays the digital media files specified in the first playlist;

wherein the first and second playlists are provided while the digital media player is off-line, thus providing a radio-like listening experience without requiring a connection to a network.

36. The memory device of claim 35, wherein the memory comprises a hidden partition and a public partition, and wherein the plurality of digital media files and plurality of playlists are stored in the hidden partition.

37. The memory device of claim 35, wherein the memory device comprises a memory card.

38. A memory device comprising:

a connector configured to be removably connected with a digital media player;

a memory pre-loaded with a plurality of digital media files, a first plurality of playlists associated with a first user-selectable channel, and a second plurality of playlists associated with a second user-selectable channel, wherein by being pre-loaded, a user is not required to write the plurality of digital media files and the plurality of playlists onto the memory device, wherein each playlist specifies a predetermined play order of at least some of the plurality of digital media files; and a controller in communication with the connector and the memory, wherein the controller is configured to:

provide a first playlist from the plurality of playlists to the digital media player in response to a request from the digital media player, wherein the first playlist is associated with the first channel; and provide a second playlist from the plurality of playlists to the digital media player in response to a request from the digital media player after the digital media player plays the digital media files specified in the first playlist, wherein the second playlist is associated with the first channel;

wherein the first and second playlists are provided while the digital media player is off-line, thus providing a radio-like listening experience without requiring a connection to a network.

39. The memory device of claim 38, wherein the memory comprises a hidden partition and a public partition, and wherein the plurality of digital media files and first and second plurality of playlists are stored in the hidden partition.

40. The memory device of claim 38, wherein the memory device comprises a memory card.

* * * * *